(12) United States Patent
Komatsu

(10) Patent No.: US 6,278,170 B1
(45) Date of Patent: Aug. 21, 2001

(54) SEMICONDUCTOR MULTIPLE QUANTUM WELL MACH-ZEHNDER OPTICAL MODULATOR AND METHOD FOR FABRICATING THE SAME

(75) Inventor: Keiro Komatsu, Tokyo (JP)

(73) Assignee: NEC Corporation, Tokyo (JP)

( * ) Notice: Subject to any disclaimer, the term of this patent is extended or adjusted under 35 U.S.C. 154(b) by 971 days.

(21) Appl. No.: 08/589,584

(22) Filed: Jan. 22, 1996

Related U.S. Application Data

(63) Continuation-in-part of application No. 08/364,455, filed on Dec. 27, 1994, now abandoned.

(30) Foreign Application Priority Data

Dec. 27, 1993 (JP) .................................. 5-331409

(51) Int. Cl.[7] .................................. H01L 33/00
(52) U.S. Cl. .................................. 257/458
(58) Field of Search .................................. 257/458

(56) References Cited

PUBLICATIONS

H. Sano et al., "InGaAs/InAlAs MQW Mach–Zehnder Optical modulator for 10–Gbit/s long–haul transmission systems", Optical Fiber Communication Conference, 1992, pp. 223–224.

C. Rolland et al., "10 Gb/s, 120km normal fiber transmission experiment using a 1.56 m Muliple Quantum Well InP/InGaAsP Mach–Zehnder modulator", OFC/IOOC '93, pp. 111–114.

H. Sano et al., "High–Speed InGaAs/InAlAs MQW Mach–Zehnder–type optical modulator", OFC/IOOC '93 Technical Digest, pp. 215–217.

Sasaki et al, "Novel Structure Photenic Devices . . . ", NEC Research & Development vol. 33 No. 3, Jul. 1992.*

Rolland et al, "10 Gbit/s, 1.56 . . . optical med . . " Elec Lttrs vol. 29 No. 5, pp 471–2, Mar. 1993.*

* cited by examiner

Primary Examiner—Stephen D. Meier
(74) Attorney, Agent, or Firm—Young & Thompson

(57) ABSTRACT

A Mach-Zehnder type optical modulator having a ridge structure including a multiple quantum well wave guide layer expending both in a passive region and in an active phase modulation region on which an electrical field is applied, wherein the wave guide layer is selectively grown by a metal organic vapor phase epitaxy with use of dielectric stripe mask patterns having a large width in the active phase modulation region and a small width in the passive region so that the wave guide layer has a band gap wavelength equal to or near a wavelength of an incidental light in the active phase modulation region and a smaller band gap wavelength smaller than the wavelength of the incidental light in the passive region.

5 Claims, 11 Drawing Sheets

SEMICONDUCTOR MULTIPLE QUANTUM WELL MACH-ZEHNDER OPTICAL MODULATOR AND METHOD FOR FABRICATING THE SAME

This application is a continuation-in-part of application Ser. No. 08/364,455, filed Dec. 27, 1994, now abandoned.

BACKGROUND OF THE INVENTION

1. Field of the Invention

The invention relates to a semiconductor multiple quantum well Mach-Zehnder optical modulator having a low driving voltage and a low optical wave guide loss and a method for fabricating the same.

2. Description of the Related Art

An optical modulator is expected as one of the most important elements constituting optical communication system is and optical information processing systems. In various kinds of the optical modulators, a Mach-Zehnder type optical modulator receives a great deal of attention and expectation due to no wave form deterioration due to a chirping in the modulation light. A high speed and long distance optical transmission is mainly limited by the wave form deterioration due to the chirping in the modulated light. The wave form deterioration due to the chirping in the modulated light is remarkable as the optical transmission speed and the optical transmission distance are large. For those reasons, the Mach-Zehnder type optical modulator free from any chirping problem is expected as an optical modulator permitting a high speed and long distance optical transmission.

When a semiconductor is placed in an electrical field, the absorption coefficient changes with the electrical field. This phenomenon has been known as the Franz-Keldysh effect. When a bulk semiconductor is placed in an electrical field, the refraction index changes in proportion to the intensity of the electrical field. When a quantum well or multiple quantum wells are placed in an electrical field, the refraction index changes by a quantum confined Stark effect. The Mach-Zhender type optical modulator utilizes the phenomenon of the shift of the refractive index of the wave guide when applied with the electrical field.

A typical structure of the Mach-Zehnder type optical modulator comprises two passive regions each of which includes a Y-branch wave guide and an active region including two of phase modulation arms on which an electric field is applied. The Mach-Zehnder type optical modulator having a multiple quantum well wave guide structure is disclosed in 1993 electron information and communication conference, C-151, 4-187 reported by Hirohisa SANO et al. The multiple quantum well wave guide of the Mach-Zehnder optical modulator has a ridge wave guide structure. An incident light wavelength is 1.55 micrometers. The multiple quantum well structure comprises 30-periods of InGaAs/InAlAs layers wherein each InGaAs layer serves as a potential well having a thickness of 6.5 nanometers and each InAlAs layer serves as a potential barrier having a thickness of 6.0 nanometers so that a band gap wavelength is 1.45 micrometers. A total length of the Mach-Zehnder type optical modulator is 1.2. millimeters and a length of the active region of the phase modulation region on which the electrical field is applied is 0.5 millimeters. When the incidental light wavelength is 1.55 micrometers, a half wavelength voltage is 4.2 V and an extinction ratio is 13 dB and an insertion loss is 12 dB.

As described above, the multiple quantum well Mach-Zhender optical modulator utilizes a change of the refractive index of the multiple quantum well wave guide by applying an electrical field on the phase modulation arms in the phase modulation region. The Mach-Zehnder optical modulator has a smaller size as compared to a dielectric optical modulator using $LiNbO_3$.

In view of further improvements in performances of the Mach-Zehnder optical modulator, it is very important to further reduce a driving voltage and a wave guide loss as much as possible. The Mach-Zhender optical modulator may conduct a phase modulation of light confined in the multiple quantum well wave guide constituting the phase modulation arms by application of an electrical field thereon. An amount of the phase shift of the light depends upon an intensity of the applied electrical field. The increase of the intensity of the applied electrical field requires an increase of the driving voltage. The reduction of the driving voltage of the Mach-Zehnder type optical modulator requires an improvement in efficiency of the refractive index change by application of a predetermined electrical field on the multiple quantum well wave guides in the phase modulation region of the optical modulator.

It has been known that the refractive index change in application of the predetermined electrical field on the phase modulation arms of the Mach-Zehnder optical modulator becomes large as the band gap wavelength of the multiple quantum well wave guide constituting the phase modulation arms approaches the incidental light wavelength. Notwithstanding, if the the band gap wavelength of the multiple quantum well wave guide constituting the phase modulation arms approaches the incidental light wavelength, then the wave guide loss becomes large. The large wave guide loss results in a difficulty in achieving the required long distance optical transmission. The reduction of the wave guide loss requires a large shift of the band gap wavelength of the multiple quantum well wave guide from the incidental light wavelength into a shorter wavelength range. Consequently, the phase modulation arms in the phase modulation region on which the electrical field is applied to cause an optical phase modulation is required to have such an energy band gap as corresponding nearly to or a band gap wavelength near to the incidental light wavelength.

In the conventional Mach-Zehnder optical modulator, the multiple quantum well wave guide have the uniform band gap energy or the band gap wavelength between in the active region including the phase modulation arms and in the passive regions including the Y-branches. That is why the conventional Mach-Zehnder optical modulator having the uniform band gap wavelength has a problem in obtaining both a low driving voltage and a low wave guide loss. If the band gap wavelength of the multiple quantum well wave guide is largely different from the incidental light wavelength, then the wave guide loss may be suppressed but a small refractive index change is obtained by a larger driving voltage is required to apply the necessary electrical field on the phase modulation arms for a predetermined phase shift of the light confined in the wave guide. By contrast, if the band gap wavelength of the multiple quantum well wave guide is near to the incidental light wavelength, then a large refractive index change is obtained with a low driving voltage but the wave guide loss becomes large.

Therefore, it is required to develop a novel Mach-Zehnder type optical modulator including a multiple quantum well wave guide having a difference in the band gap wavelength between the phase modulation region and the passive region including the Y-branches.

SUMMARY OF THE INVENTION

Accordingly, it is an object of the present invention to provide a novel Mach-Zehnder type optical modulator including an improved multiple quantum well wave guide free from any problem as described above.

It is a further object of the present invention to provide a novel multiple quantum well Mach-Zehnder type optical modulator showing a large refractive index change with an application of a small electrical field on a phase modulation region to obtain a large phase shift of lights.

It is a furthermore object of the present invention to provide a novel multiple quantum well Mach-Zehnder type optical modulator being performed with a low driving voltage.

It is a moreover object of the present invention to provide a novel multiple quantum well Mach-Zhender type optical modulator having a reduced wave guide loss.

It is another object of the present invention to provide a novel method of fabricating a Mach-Zehnder type optical modulator including an improved multiple quantum well wave guide free from any problem as described above.

It is still another object of the present invention to provide a novel method of fabricating a multiple quantum well Mach-Zehnder type optical modulator showing a large refractive index change with an application of a small electrical field on a phase modulation region to obtain a large phase shift of lights.

It is yet another object of the present invention to provide a novel method of fabricating a multiple quantum well Mach-Zehnder type optical modulator being performed with a low driving voltage.

It is an additional object of the present invention to provide a novel method of fabricating a multiple quantum well Mach-Zhender type optical modulator having a reduced wave guide loss.

The above and other objects, features and advantages of the present invention will be described from the following descriptions.

The invention provides a novel Mach-Zehnder type optical modulator having multiple quantum well wave guide structure that comprises two Y-branch portions in passive regions and two phase modulation arm portions in an active region between the passive region wherein only the phase modulation arm portions of the wave guide receives an electrical field. The phase modulation arm portions of the multiple quantum well wave guide has a band gap wavelength equal to or near an incidental light wavelength to cause a large refractive index change by the application of a low electrical field, while the Y-branch portions of the multiple quantum well wave guide has a sufficiently small band gap wavelength than the band gap wave length of the phase modulation arm portions to thereby suppress a wave guide loss and reduce a driving voltage of the modulator.

The multiple quantum well wave guide having different band gap wavelengths between in the phase modulation arm portions in the active region and in the Y-branch portions in the passive regions has a ridge structure that is selectively grown by use of a metal organic vapor phase epitaxy process employing dielectric silicon oxide mask stripe masks of having a difference in width between in the active region and in the passive region and having a uniform gap distance between the mask patterns. The mask pattern width in the active region is larger than the mask pattern width in the passive region to grow the multiple quantum well wave guide in the form of the ridge structure having in the phase modulation arm portions thereof the band gap wavelength equal to or near the incidental light wavelength and in the Y-branch portions the smaller band gap wavelength.

BRIEF DESCRIPTIONS OF THE DRAWINGS

Preferred embodiments of the present invention will hereinafter fully be described in detail with reference to the accompanying drawings.

DESCRIPTIONS OF THE INVENTION

Figure 1:
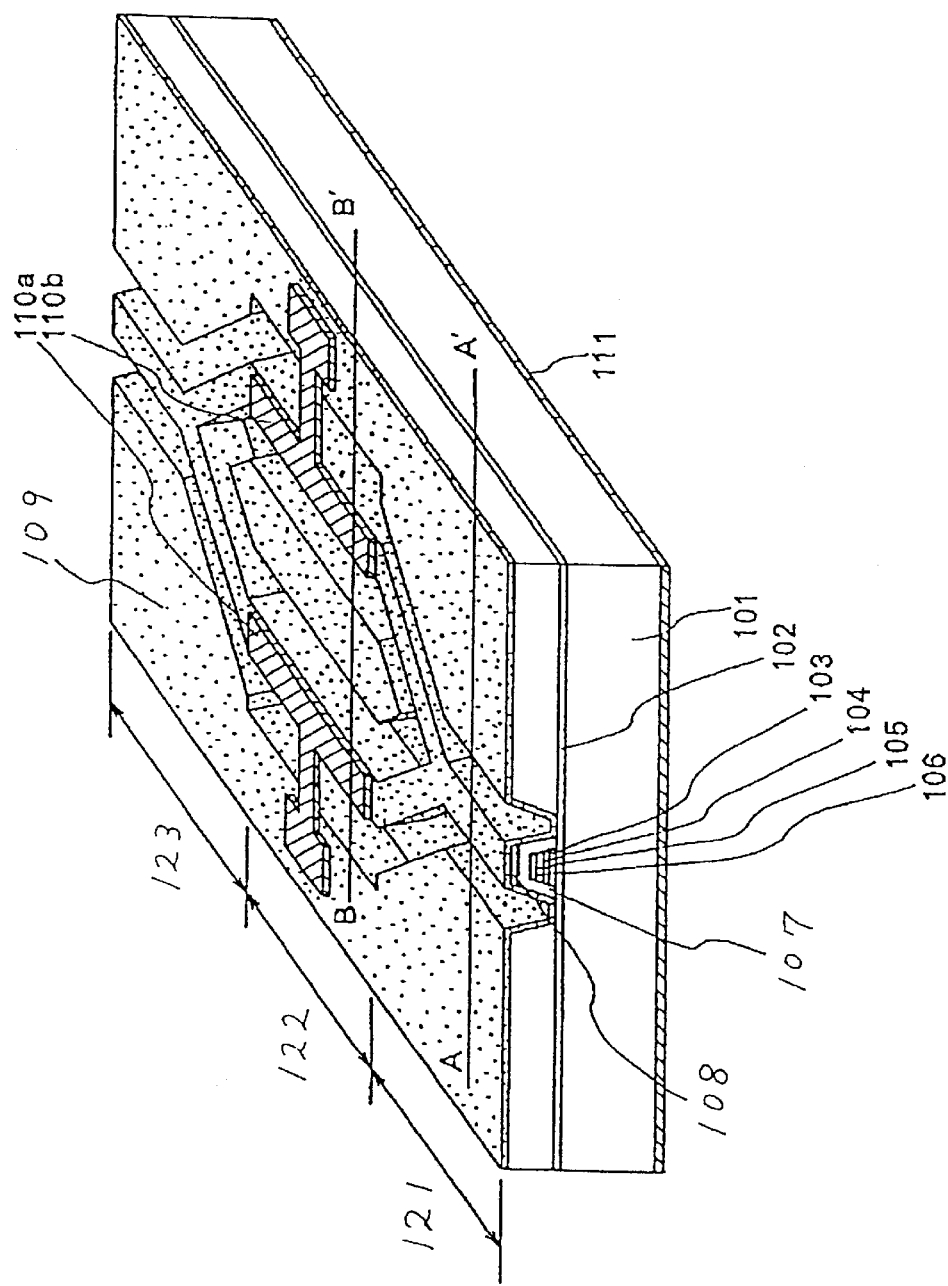
FIG. 1 is a perspective view illustrative of a novel multiple quantum well Mach-Zehnder type optical modulator in a first embodiment according to the present invention.

The invention provides a novel Mach-Zehnder type optical modulator having a ridge-shaped quantum well wave guide structure that comprises two Y-branch passive waveguide portions in passive regions and two parallel straight phase modulation arm portions in an active region between the passive region wherein only the phase modulation arm portions of the wave guide receives an electrical field. The phase modulation arm portions of the multiple quantum well wave guide has a band gap wavelength equal to or near an incidental light wavelength to cause a large refractive index change by the application of a low electrical field, while the Y-branch portions of the multiple quantum well wave guide has a sufficiently small band gap wavelength than the band gap wave length of the phase modulation arm portions to thereby suppress a wave guide loss and reduce a driving voltage of the modulator.

The multiple wave guide having different band gap wavelengths between in the phase modulation arm portions in the active region and in the Y-branch portions in the passive region has a ridge structure that is selectively grown by use of a metal organic vapor phase epitaxy process employing dielectric strip masks of silicon oxide (silicon oxide mask patterns) having a difference in width between in the active region and in the passive region and having a uniform gap distance between the mask patterns. The mask pattern width in the active region is larger than the mask pattern width in the passive region to grow the multiple quantum well wave guide in the form of the ridge structure having in the phase modulation arm portions thereof the band gap wavelength equal to or near the incidental light wavelength and in the Y-branch portions the smaller band gap wavelength. The variation in width of the dielectric mask pattern results in variations in composition and thickness of the wave guide layers grown by use of the dielectric mask pattern in the metal organic vapor phase epitaxy process. The variations in composition and thickness of the multiple quantum well wave guide layers provides variations in energy band gap and light propagation constant of the multiple quantum well wave guide. The thickness of the multiple quantum well optical wave-guide layer provided on the first and second passive regions is larger than the thickness provided on the active region. The variations in energy band gap and light propagation constant of the multiple quantum well wave guide provides a variation of the band gap wavelength. For those reasons, the above band gap control technique by use of the silicon oxide mask pattern having a difference in width between in the active region and in the passive region may permit only a single metal organic vapor phase epitaxy process to grow the ridge structure of the multiple quantum well wave guide having a difference in the band gap wavelength between in the phase modulation arm portions and in the Y-branch portions. The two parallel straight phase modulation arm portions in the active region have a band gap wavelength equal to or near the predetermined incidental light wavelength to cause a possible large change in the refractive index of the arm portions by the application of a low electrical field on the active region. By contrast, the Y-branch portions in the passive region has the sufficiently smaller band gap wavelength than the band gap wavelength of the phase modulation arm portions in the active region for a possible suppression of the wave guide loss.

When the band gap wavelength of the multiple quantum well wave guide is largely different from the incidental light wavelength, then a low wave guide loss is obtained while a small refractive index change is obtained even by application of a large electrical field on the phase modulation arm portions. By contrast, when the band gap wavelength of the multiple quantum well wave guide is equal to or near the incidental light wavelength, then a large wave guide lose is caused, notwithstanding, a larger refractive index change of the multiple quantum well wave guide in the phase modulation region is obtained by an application of a small electrical field on the phase modulation region. The larger refractive index change of the multiple quantum well wave guide with the application of the small electrical field permits a larger phase shift of the light confined in the multiple quantum well wave guide in the phase modulation region on which the electrical field is applied. The achievement of the required phase shift of the light confined in the phase modulation arm portions of the multiple quantum well wave guide with the application of the small electrical field results in a low driving voltage.

From the above descriptions, it could no doubt be appreciated that the novel structure and fabrication method of the multiple quantum well wave guide Mach-Zehnder optical modulator has a low driving voltage and a low wave guide loss thereby permitting an establishment of a high speed and long distance optical transmission system.

The following descriptions will focus on preferred embodiments of the present invention to sufficiently understand the structure of the novel multiple quantum well Mach-Zehnder type optical modulator and the novel method for fabricating the modulator.

As illustrated in FIG. 1 a novel Mach-Zhender type optical modulator is formed on an n-InP substrate 101 An n-InP cladding layer 102 is formed on an entire surface of the top surface of the substrate 101. The substrate 101 comprises two passive regions 121 and 123 and an active region 122. The ridge structure is selectively formed to comprise two Y-branch portions on the passive regions 121 and 123 and two phase modulation arms on the active region 122. The ridge structure may comprise multiple layer structure comprising an n-InP buffer layer 103 on the cladding layer 102, 10–40 periods of i-InGaAs/InGaAsP multiple quantum well wave guide layers/potential barrier layers 104 on the buffer layer 103, an i-InP cladding layer 105 on the wave guide layer 104 and p-InP cladding layer 106 on the i-InP cladding layer 105. A p-InP cladding layer 107 is formed to cover a top surface of layers 105 and 106 and sloped side walls of laminations of the buffer layer 103, wave-guide layer 104 and layers 105 and 106. A p-InGaAs cap layer 108 is formed on a top portion of the p-InP cladding layer 107. A silicon oxide film protection dielectric layer 109 is formed to cover at least entire surface of the modulator. Two p-side electrodes 110a and 110b are provided on the cap layer 108 through windows of the silicon oxide protection layer 109 over the entire part of the two parallel straight phase modulation arm portions of the ridge structure in the active region 122 so as to apply an electrical field on the phase modulation arm portions. An n-side electrode 111 is provided on an entire bottom surface of the substrate 101. The above multiple quantum well wave guide layer 104 of the phase modulation arm portions has a band gap wavelength that is almost the same as or near to the incidental light wavelength, while the above multiple quantum well wave guide layer 104 of the phase modulation arm portions has a smaller band gap wavelength than the incidental light wavelength.

Figure 2A:
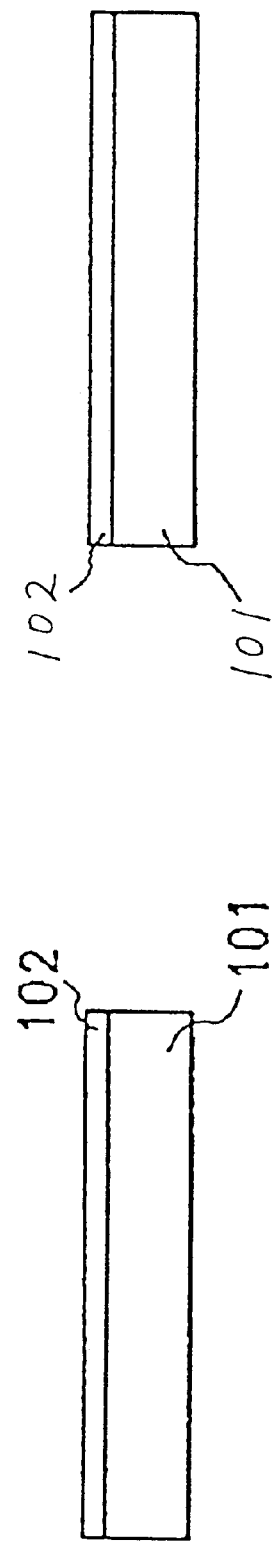
FIGS. 2A to 2E are fragmentary cross sectional elevation views along A-A' line and B-B' line illustrative of a novel multiple quantum well Mach-Zehnder type optical modulator in sequential steps involved in a novel method of fabricating the modulator of FIG. 1.
Figure 2:
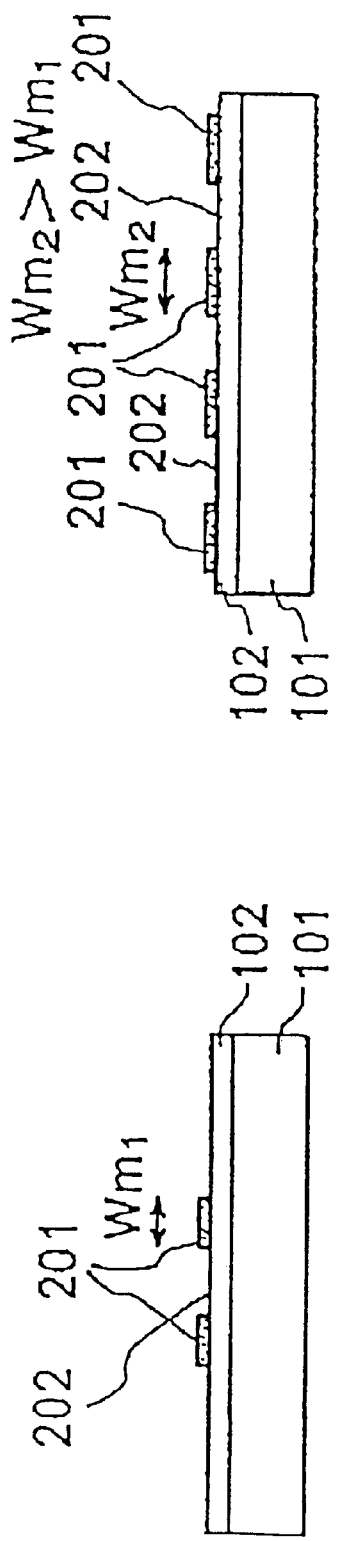
Figure 3:
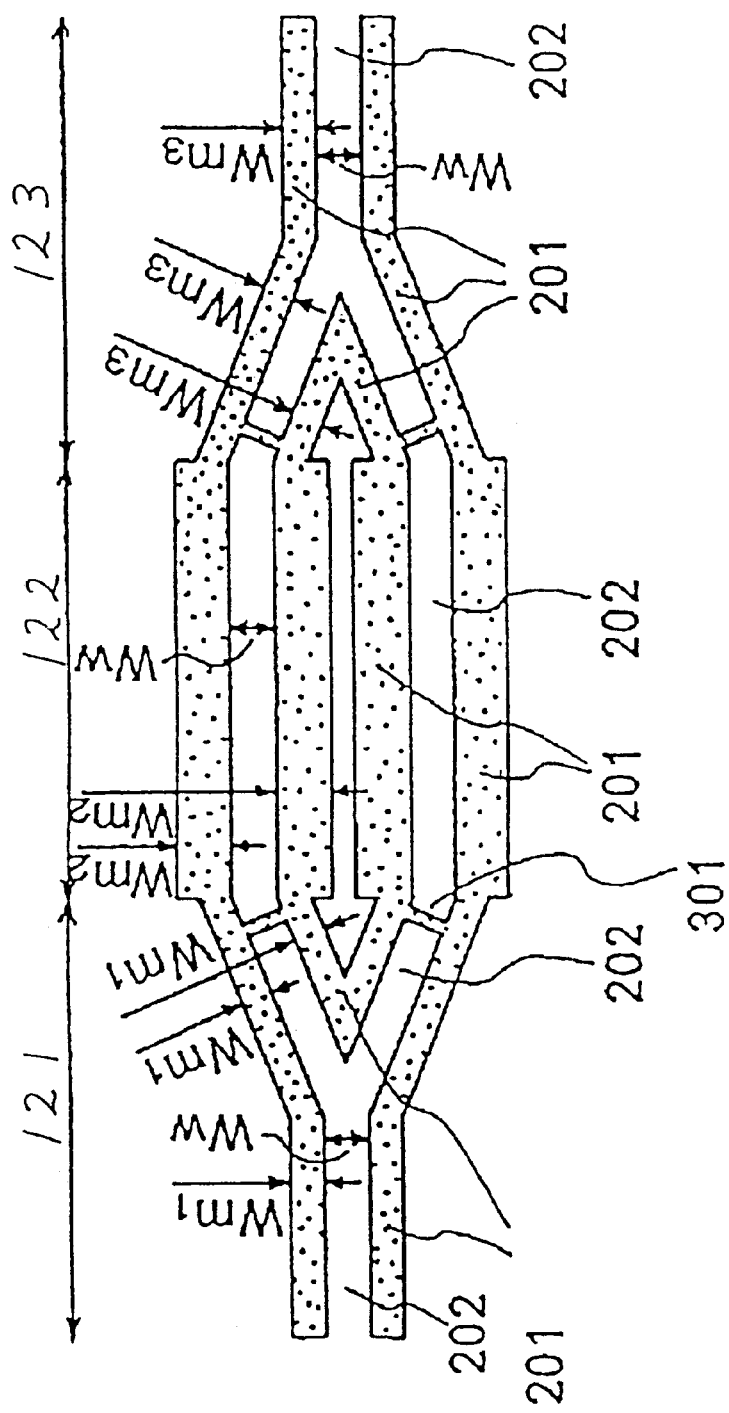
FIG. 3 is a view illustrative of a silicon oxide mask pattern used in a fabrication step involved in a novel method of fabricating a novel multiple quantum well Mach-Zehnder type optical modulator of FIG. 1.

The novel Mach-Zehnder optical modulator may be fabricated by the following steps. With reference to FIG. 2A, the n-InP cladding layer 102 is formed by a metal organic vapor phase epitaxy on a (100) face of the n-InP substrate 101. The cladding layer 102 has a thickness of 0.3 micrometers and an impurity concentration of $2 \times 10^{-17}$ cm$^3$. A silicon oxide film is formed on an entire surface of the n-InP cladding layer 102 to subsequently be patterned to form by a photo-lithography a silicon oxide mask pattern 201 as illustrated in FIGS. 2B and 3.

The silicon oxide mask patten 201 has apertures 202 with a uniform distance Ww of 2 micrometers over both the passive regions 121 and 123 and the active region 122. The ridge structure including the multiple quantum well wave guide layer 104 is formed on the aperture 202 of the mask pattern 201. To obtain a variation of the band gap wavelength of the multiple quantum well wave guide layer, the silicon oxide mask pattern 201 has difference in width between the passive regions 121 and 123 and the active region 122. The width ratio of the dielectric strip masks of the active region to the first and second passive regions is selected to be 12:5, or more. For example, widths Wm1 and Wm3 of the mask pattern in the passive regions 121 and 123 can be selected to be 5 micrometers, while a width of the mask pattern in the phase modulation active region 122 can be selected to be 12 micrometers. The mask pattern 201 has electrode isolation portions 301 in the vicinity of the boundary of the phase modulation active region 122 and the passive regions 121 and 123 to obtain an isolation between the two p-side electrodes 110a and 110b. A stripe of the aperture 202 of the mask is almost directed along a direction (011) of the substrate 101.

Figure 2C:
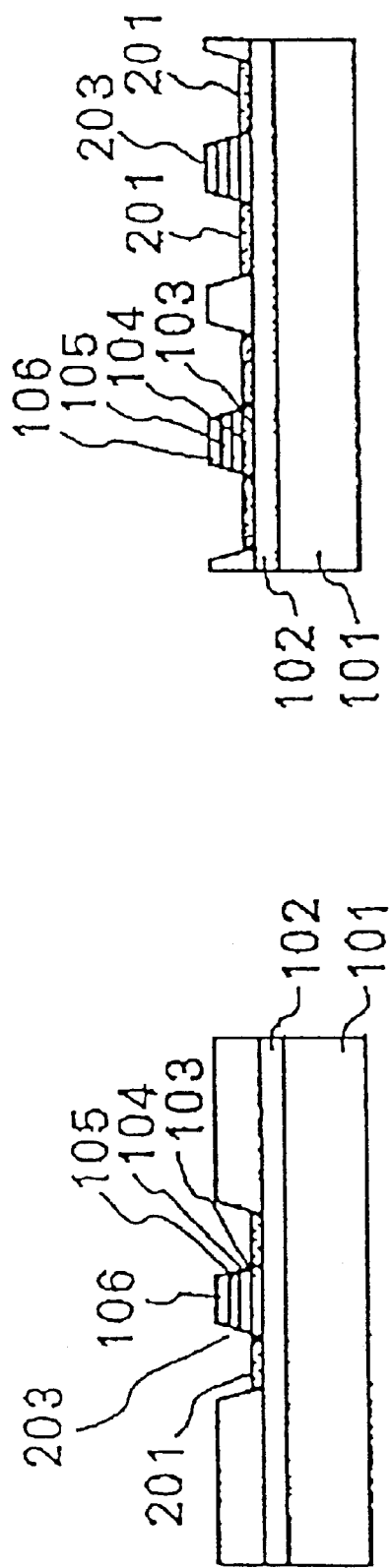
Figure 2:
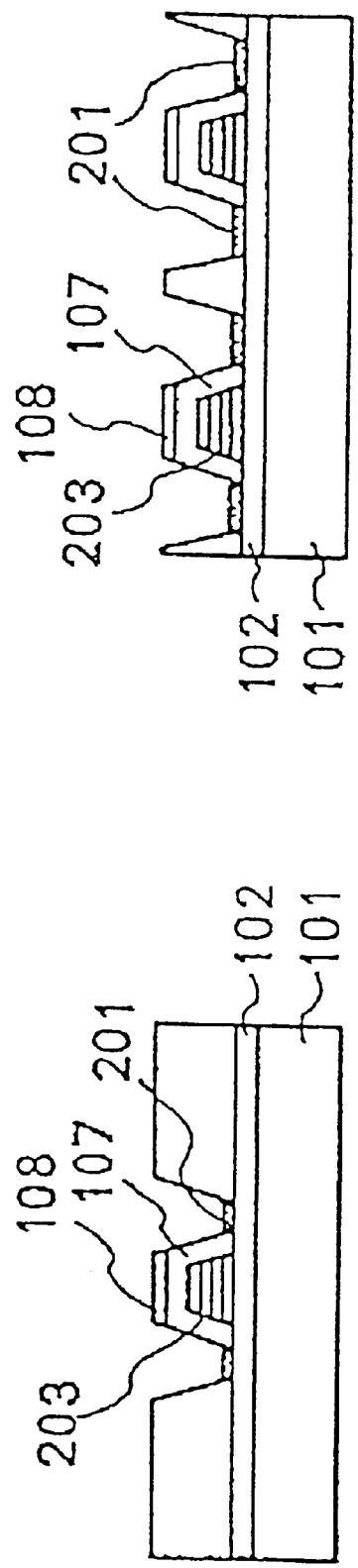

As illustrated in FIG. 2C, a metal organic vapor phase epitaxy is carried out by use of the mask pattern 201 to grow the ridge structure including the multiple quantum well wave guide layer 104 on the apertures 202 of the mask pattern 201. The n-InP buffer layer 103, the i-InGaAs/InGaAs multiple quantum well layer 104, the i-InP cladding layer 105 and the p-InP cladding layer 106 are sequentially grown by the above metal organic vapor phase epitaxy method using the mask pattern 202 to thereby form a mesa structure on the aperture 202 of the mask pattern 201. The mesa structure has side faces of a (111)B face. The n-InP buffer layer 103 has a thickness of 0.1 micrometers. The i-InP cladding layer 105 has a thickness of 0.1 micrometers. The p-InP cladding layer 106 has a thickness of 0.2 micrometers and an impurity concentration of $5×10^{17}$ cm$^{-1}$. The i-InGaAs/InGaAsP multiple quantum well layer 104 in the active phase modulation region 122 has between 10 to 40 periods, for example 25 periods of InGaAs well layers latticed matched to the InP layer and InGaAsP potential barrier layers having a composition wavelength of 1.15 micrometers. In the phase modulation region 122, the quantum well has a thickness of 35 angstroms or more and the potential barrier has a thickness in the range of 50–100 angstroms so that in the phase modulation region 122 the multiple quantum well wave guide layer 104 on the active has a band gap wavelength in the range of 1.45 to 1.52 micrometers wherein the incidental light wavelength is 1.55 micrometers. The total thickness of the multiple quantum well wave guide layer 104 is 0.25 micrometers.

Figure 4:
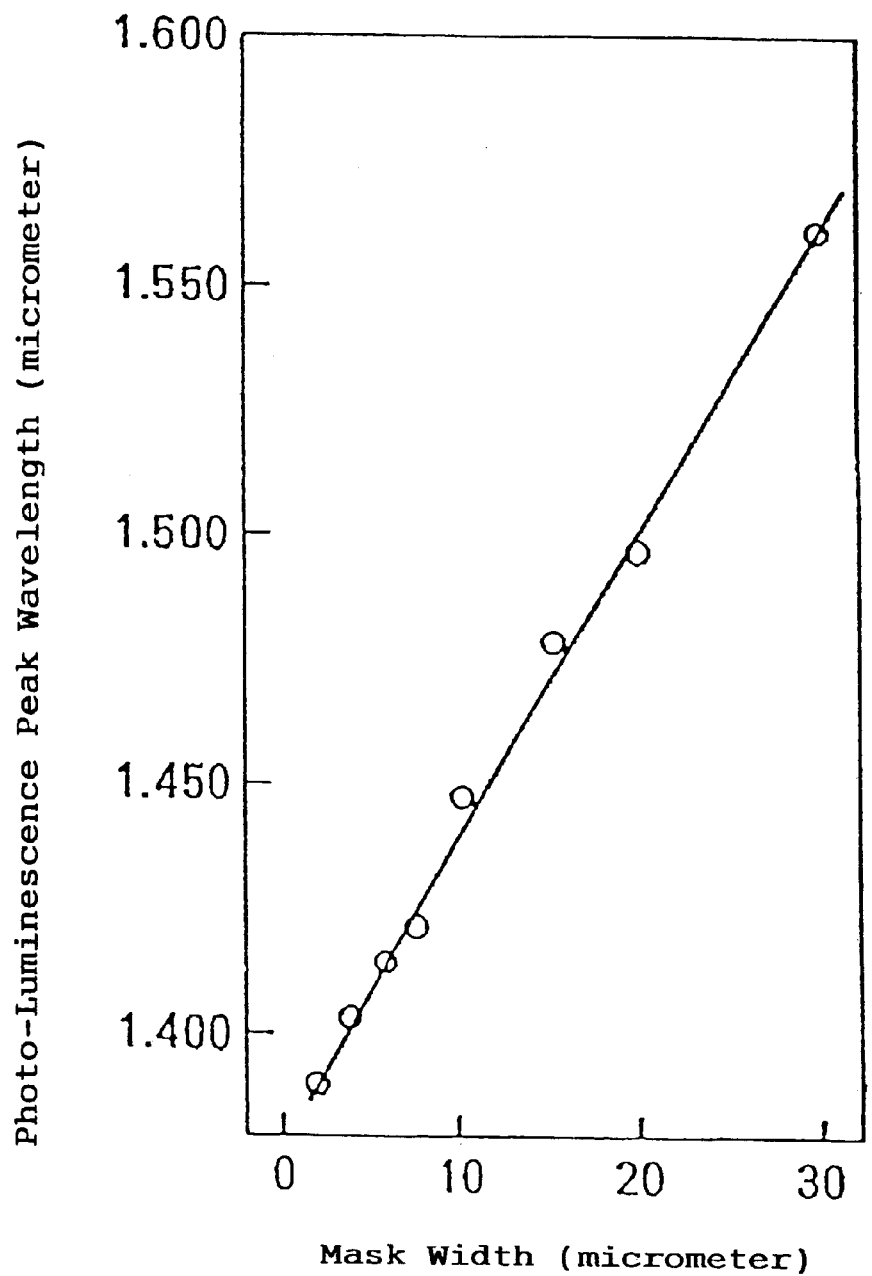
FIG. 4 is a diagram illustrative of a photoluminescence peak wavelength versus an width of an silicon oxide mask pattern used in a metal organic vapor phase epitaxy method.

As described above, the mask pattern 201 has a difference in width between the passive regions 121 and 123 and the active phase modulation region 122. The thickness of the quantum well is proportional to the width of the mask pattern 201. Namely, increase of the width of the mask patten 201 results in an increase of the composition wavelength or the increase of the band gap wavelength so that the band gap wavelength of the multiple quantum well wave guide layer 104 in the active phase modulation region 122 is larger than the band gap wavelength thereof in the passive regions 121 and 123. A relationship between a photoluminescence peak wavelength of the multiple quantum well wave guide layer 104 and a mask pattern width is illustrated in FIG. 4. The width ratio of the dielectric strip mask of the active region to the first and second passive regions is at least 12:5. For example, the mask widths Wm1 and Wm2 in the active phase modulation region 122 and the passive regions 121 and 123 can be selected 12 micrometers and 5 micrometers, respectively. The photoluminescence peak wavelength is 1.45 micrometers in the active phase modulation region 122 and 1.41 micrometers in the passive regions 121 and 123. From the above descriptions, it could be understood that the multiple quantum well wave guide layer 104 having the difference in the band gap wavelength or the photoluminescence peak wavelength between the active phase modulation region 122 and the passive regions 121 and 123.

With reference back to FIG. 2D, the mask pattern 201 is selectively removed at opposite side portions with a width of 2 micrometers along the double mesa structure 203 to enlarge the width of the aperture 202 of the mask pattern 201. A p-InP cladding layer 107 and a p-InGaAs cap layer 108 are sequentially grown on the aperture 202 with the enlarged width of the mask pattern 201 by the metal organic vapor phase epitaxy. The p-InP cladding layer 107 and the p-InGaAs cap layer 108 have thicknesses of 1 micrometer and 0.2 micrometers as well as impurity concentrations of $5×10^{17}$ cm$^{-3}$ and $2×10^{18}$ cm$^{-3}$ respectively.

Figure 2E:
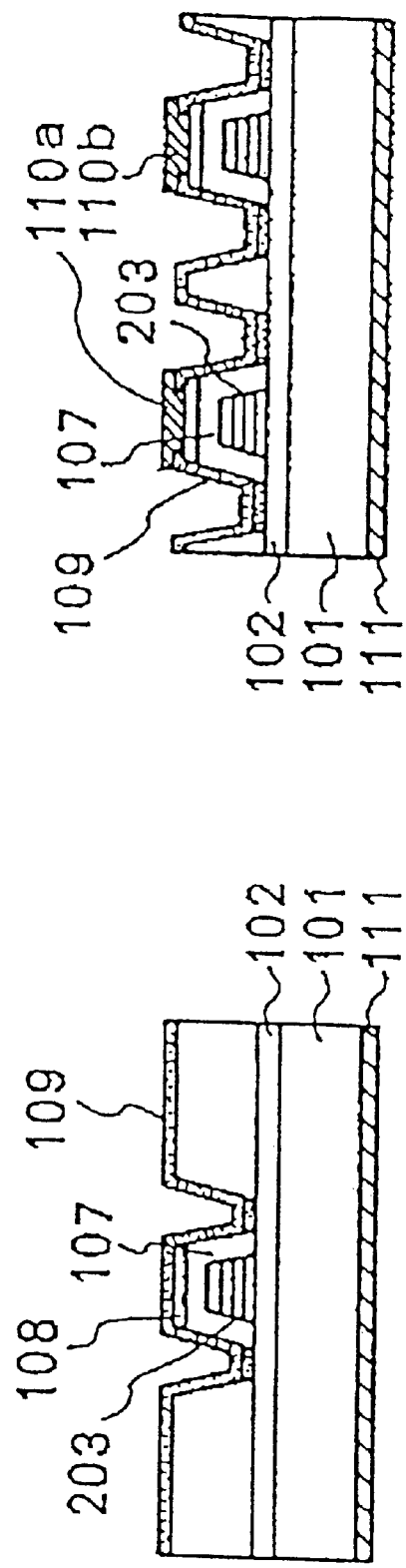

With reference to FIG. 2E, a silicon oxide film protection layer 108 is formed on an entire surface of the device. In the active phase modulation region 122 only, a pair of p-side electrodes 110a and 110b made of Cr and Au are selectively formed on the cap layer 108 through windows of the silicon oxide protection layer 109. The substrate 101 is polished to have a thickness of 100 micrometers. Thereafter, the n-side electrode 111 made of Cr and Au is formed on an entire bottom surface of the substrate 101. Subsequently, the device is cleaved and receives an anti-reflecting coating on input and output faces thereof.

Figure 5:
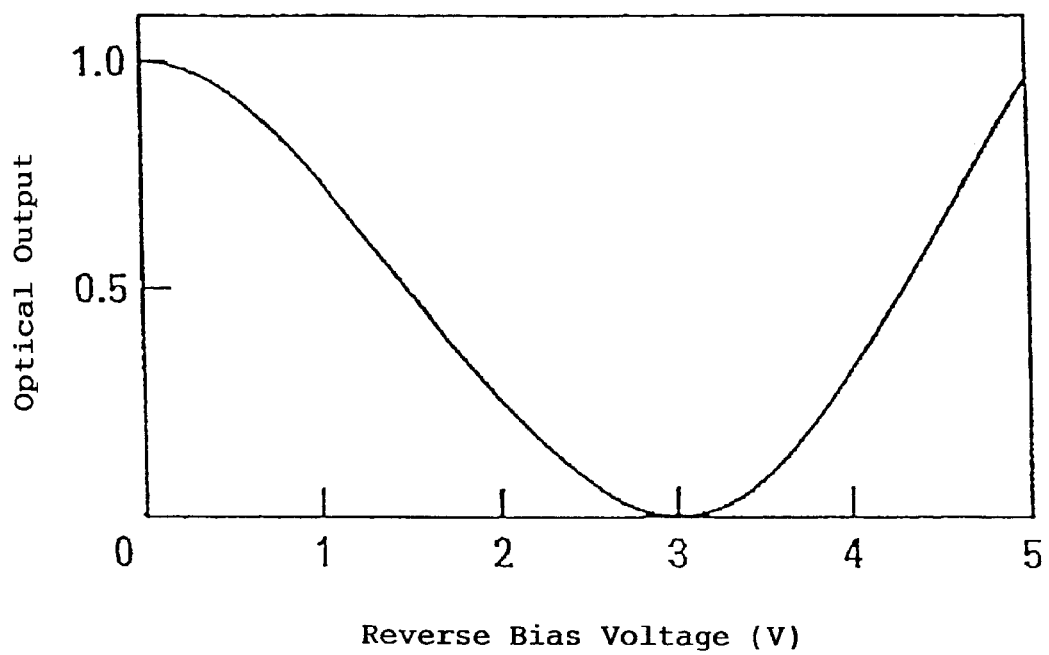
FIG. 5 is a diagram illustrative of an output light intensity versus a reverse bias voltage in a novel multiple quantum well Mach-Zehnder type optical modulator of FIG. 1.
Figure 6:
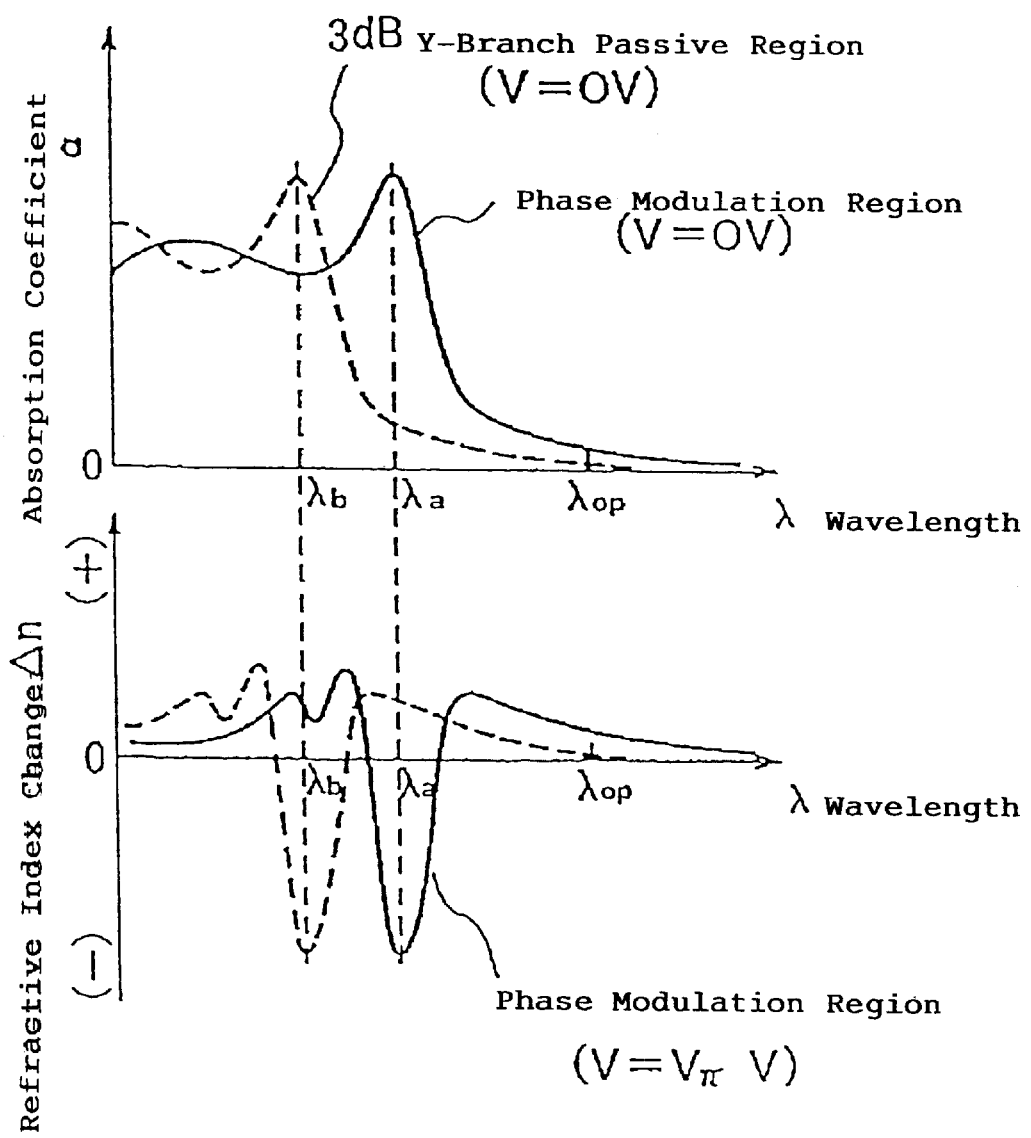
FIG. 6 is a diagram illustrative of an absorption coefficient and and a refractive index change versus a wavelength.

The following descriptions will focus on the operations of the novel Mach-Zehnder optical modulator with reference to FIGS. 1, 5 and 6. The incidental light inputted into the Mach-Zehnder optical modulator is transmitted through the multiple quantum well wave guide layer 104 of the Y-branch portion in the passive region 121 to be divided into two parts at a ratio of 1:1. The divided lights in the active phase modulation region 122 are subsequently transmitted through the phase modulation arm portions that utilizes the quantum confinement Stark effect. One of the paired p-side electrodes 110a and 110b is electrically connected to the n-side electrode 111 being grounded, while another one of the paired p-side electrodes 110a and 110b receives a reverse bias. When the reverse bias is 0V, then the light in the phase modulation arm portion receives no phase shift thereby resulting in no cancellation of the light combined by the Y-branch portion in the passive region 123. As a result, an optical output is obtained. In this case, the optical modulator is placed in ON state. By contrast, the reverse bias is 3V, then the light in the phase modulation arm portion receives a phase shift of "pi" thereby resulting in a cancellation of the lights combined by the Y-branch portion in the passive region 123. As a result, no optical output is obtained. In this case, the optical modulator is placed in OFF state. A relationship of the light output and the reverse bias voltage is illustrated in FIG. 5.

FIG. 6 illustrates relationships of absorption coefficient and refractive index change versus the band gap wavelength. In the active phase modulation region 122, the band gap wavelength of the wave guide layer 104 is in the range of 1.45 to 1.52 micrometers and the incidental light wavelength is 1.55 micrometers. It could be understood that in the active phase modulation region 122 a light absorption appears but a large refractive index change is obtained by an application with a small electrical field. This may permit the driving of the optical modulator is achieved by a small electrical field on the active phase modulation region 122. This may permit a low voltage driving of the optical modulator. By contrast, the wave guide layer 104 of the Y-branch portions in the passive regions 121 and 123 is almost free from the light absorption or the wave guide loss.

The phase modulation arm portion and the Y-branch portions are completely and smoothly coupled to each other at almost 100% coupling because both portions are grown by the single metal organic vapor phase epitaxy method according to the present invention.

The mesa structure by the above method of the novel optical modulator has a very smooth side face to prevent a scattering loss of the propagating light in the wave guide.

Figure 7:
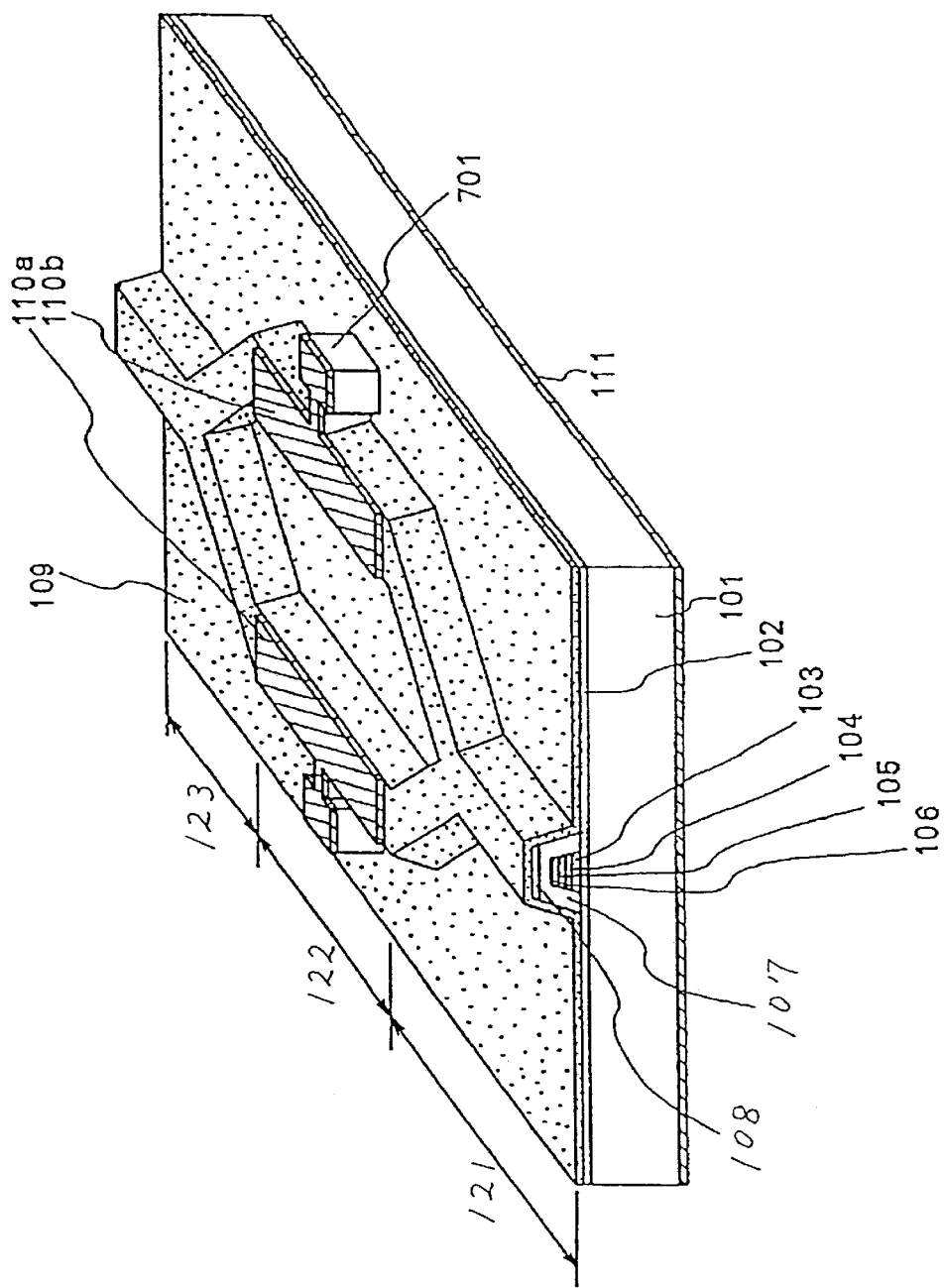
FIG. 7 is a perspective view illustrative of a novel multiple quantum well Mach-Zehnder type optical modulator in a second embodiment according to the present invention.

To reduce a parasitic capacitance of the electrodes for a high speed modulation, polyimide resin layers 701 are formed on the dielectric film 109 outside of the two parallel straight phase modulation sections. Two pads are provided on the polyimide layers 701, the two pads being connected to the two top electrodes 110a and 110b, respectively, as illustrated in FIG. 7. In this manner, the optical modulator is available for a high speed modulation of Gb/s order.

Whereas modifications of the present invention will no doubt be apparent to a person having ordinary skill in the art, to which the invention pertains, it is to be understood that embodiments as shown and described by way of illustrations are by means intended to be considered in a limiting sense. Accordingly, it is to be intended to cover by claims all modifications of the invention which fall within the sprit and scope of the invention.

What is claimed is:

1. A Mach-Zehnder optical modulator having first and second passive regions and an active region between said first and second passive regions, said Mach-Zehnder optical modulator comprising:
   a semiconductor substrate extending over said first and second passive regions and said active region;
   a bottom electrode extending on an entire part of a bottom surface of said semiconductor substrate;
   a first cladding layer extending on an entire part of a top surface of said semiconductor substrate;
   a ridge-shaped optical wave-guide having: a Y-branching passive wave-guide section on said first passive regions; a Y-coupling passive wave-guide section on said second passive regions; and two parallel straight phase modulator sections on said active region; wherein said ridge-shaped optical wave-guide comprises:
   a buffer layer provided on said first cladding layer;
   a multiple quantum well optical wave-guide layer provided on said buffer layer, said multiple quantum well optical wave-guide layer being grown by a metal organic vapor phase epitaxy using dielectric stripe masks having a large width in said active region and a small width in said first and second passive regions so that said multiple quantum well optical wave-guide layer provided on said first and second passive regions has a band gap wavelength smaller than that provided on said active region;
   a second cladding layer provided on said multiple quantum well optical wave-guide layer;
   a third cladding layer covering a top surface of said second cladding layer and sloped side walls of laminations of said buffer layer, multiple quantum well optical wave-guide layer, and second cladding layer; and
   a cap layer formed on a top surface of said third cladding layer;
   a dielectric film covering at least an entire surface and said ridge-shaped optical wave-guide; and
   two top electrodes extending over an entire part of said two parallel straight phase modulator sections.

2. The modulator as claimed in claim 1, further comprising:
   polyimide resin layers formed on said dielectric film outside of said two parallel straight phase modulator sections; and
   two pads provided on said polyimide resin layers, said two pads being connected to said two top electrodes, respectively, to reduce parasitic capacitance of said top electrodes.

3. The modulator as claimed in claim 1, wherein a ratio in width of said dielectric stripe masks of said action region to said first and second passive regions is at least 12:5.

4. The modulator as claimed in claim 1, wherein said band gap wavelength of said wave-guide layer on said active region is in the range of 1.45–1.52 micrometers when a wavelength of an incidental light is 1.55 micrometers.

5. The modulator as claimed in claim 1, wherein said wave-guide layer comprises a plurality of laminations, in the range of periods from 10–40, of i-InGaAs quantum well layers and i-InGasP potential barrier layers, each said well layer having a thickness of at least 35 angstroms and each said barrier layer having a thickness in the range of 50–100 angstroms.

* * * * *